(12) United States Patent
Schunke et al.

(10) Patent No.: US 7,069,803 B2
(45) Date of Patent: Jul. 4, 2006

(54) ADJUSTMENT DRIVE

(75) Inventors: Kurt Schunke, Minden (DE); Bernd Buchholz, Rahden (DE); Dieter Palm, Werther (DE); Gerhard Bruns, Bückeburg (DE)

(73) Assignee: RK Rose + Krieger GmbH & Co. KG Verbindungs- und Positioniersysteme, Minden (DE)

( * ) Notice: Subject to any disclaimer, the term of this patent is extended or adjusted under 35 U.S.C. 154(b) by 46 days.

(21) Appl. No.: 10/693,828

(22) Filed: Oct. 24, 2003

(65) Prior Publication Data

US 2004/0173039 A1    Sep. 9, 2004

Related U.S. Application Data

(63) Continuation of application No. PCT/EP02/03832, filed on Apr. 6, 2002.

(30) Foreign Application Priority Data

Apr. 27, 2001    (DE) ............................ 201 07 324 U

(51) Int. Cl.
*F16H 1/12* (2006.01)
(52) U.S. Cl. .................................. 74/421 R; 74/421 A
(58) Field of Classification Search .................. 74/63, 74/421 R, 413, 414, 421 A
See application file for complete search history.

(56) References Cited

U.S. PATENT DOCUMENTS

| | | | | | |
|---|---|---|---|---|---|
| 3,202,007 | A | * | 8/1965 | Stratienko | 74/413 |
| 4,441,378 | A | * | 4/1984 | Ponczek | 74/414 |
| 4,802,372 | A | * | 2/1989 | Harrod et al. | 74/325 |
| 4,826,458 | A | * | 5/1989 | Irwin et al. | 440/37 |
| 5,737,968 | A | * | 4/1998 | Hardey et al. | 74/421 A |
| 5,818,133 | A | * | 10/1998 | Kershaw et al. | 310/67 R |
| 6,021,692 | A | * | 2/2000 | Norfolk et al. | 74/606 R |
| 6,033,148 | A | * | 3/2000 | Norfolk et al. | 405/3 |

FOREIGN PATENT DOCUMENTS

| | | | |
|---|---|---|---|
| DE | 93 18 082 U | | 2/1994 |
| DE | 201 07 324 U | | 6/2001 |
| JP | 06200788 A | * | 7/1994 |
| JP | 08 154358 A | | 6/1996 |
| JP | 09 205755 A | | 8/1997 |
| JP | 2000 193045 A | | 7/2000 |

* cited by examiner

*Primary Examiner*—David Fenstermacher
(74) *Attorney, Agent, or Firm*—Henry M. Feiereisen

(57) ABSTRACT

An adjustment drive includes a drive motor, and a drive train in driving relationship with the drive motor for reducing a motor speed of the drive motor. The drive train includes a plurality of gear wheels operated by the drive motor and intermeshing with one another to form a chain to define at least one gear stage, whereby at least the plurality of gear wheels is supported by a carrier that defines thereby a separate drive unit.

10 Claims, 2 Drawing Sheets

ADJUSTMENT DRIVE

CROSS-REFERENCES TO RELATED APPLICATIONS

This application is a continuation of prior filed copending PCT International application no. PCT/EP02/03832, filed Apr. 6, 2002, on which priority is claimed under 35 U.S.C. §120, the disclosure of which is hereby incorporated by reference.

This application claims the priority of German Patent Application, Serial No. DE 201 07 324.2, filed Apr. 27, 2001, pursuant to 35 U.S.C. 119(a)–(d), the disclosure of which is incorporated herein by reference.

BACKGROUND OF THE INVENTION

The present invention relates to an adjustment drive, in particular for use with adjustable flap valves.

An adjustment drive of a type involved here finds application especially in heating, air-conditioning and ventilation systems for opening and closing a control element of a flap valve. Hereby, the normal basic position may also be an intermediate position. Associated to the electromotive adjustment drive is a control unit. Some applications involve opening or closing of the control element in case of a danger, e.g. adjustment of the flap valve in case of fire. Conventional adjustment drives have wheels to form a chain of wheels which are normally supported on bolts received with their end surfaces in bores of a housing. These types of construction are labor-intensive to assemble and complicated when individual wheels have to be replaced.

It would therefore be desirable and advantageous to provide an improved adjustment drive which obviates prior art shortcomings and which is compact in structure, while yet being reliable in operation.

SUMMARY OF THE INVENTION

According to one aspect of the present invention, an adjustment drive includes a drive motor, a drive train in driving relationship with the drive motor for reducing a motor speed of the drive motor, wherein the drive train includes a plurality of gear wheels operated by the drive motor and intermeshing with one another to form a chain to define at least one gear stage, and a carrier defining a separate drive unit and at least supporting the plurality of wheels.

The present invention resolves prior art shortcomings by including the carrier as a separate drive unit which can be attached to a housing of the adjustment drive so that in conjunction with the drive components mounted to the carrier, a structural unit or functional unit is realized which in its entirety can be inserted into the housing or a housing portion. Installation is very simple in view of the easy accessibility. Moreover, it is possible to execute the installation with handling systems or assembly robots. Also, there is no need to support the bolts that carry the gear wheels in the walls of the housing so that the housing walls can be dimensioned relatively thin, as its primary function is to provide protection.

According to another feature of the present invention, the drive motor may also be connected, e.g. flange-mounted, to the carrier. An advantage of such an arrangement is the formation of a separate functional unit comprised of the drive motor and the chain(s) of gear wheels, so that the housing may be omitted altogether, when the output member of the drive train is suitably configured, for adjusting the attached components. Then, only the relevant safety regulations need to be observed. Suitably, the output member of the drive train receives a hollow shaft in fixed rotative engagement. The output member may be configured as a tooth segment. The configuration of a tooth segment is sufficient because the control element to be adjusted is normally moved by a maximum of 90°. Therefore, the tooth segment can also be configured about an angle of 90°.

According to another feature of the present invention, the hollow shaft may have internal teeth for connection in a rotationally fixed manner to the control element to be adjusted. Suitably, the connection of the hollow shaft with the tooth segment is realized by a form-fitting engagement.

According to another feature of the present invention, the gear wheels may be disposed on both sides of the carrier. Suitably, the carrier has a plate-shaped configuration. In this way, the adjustment drive is very compact. The intermeshing gear wheels on each side of the carrier suitably define a gear stage.

According to another feature of the present invention, the housing may be made of two housing portions which are connectable to one another at a partition plane which extends in an area of the carrier.

According to another feature of the present invention, the carrier may be formed with a projecting centering pin so that the carrier can be better secured in place.

According to another feature of the present invention, the drive motor may be a brushless motor with an external rotor.

According to another feature of the present invention, at least the carrier and the plurality of wheels are made of metal, e.g. steel or non-ferrous heavy metal.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of four applications all filed on the same day. These applications deal with related inventions. They are commonly owned and have same inventive entity. These applications are unique, but incorporate the other by reference. Accordingly, the following U.S. patent applications are hereby expressly incorporated by reference: "Electromotive Adjustment Device", "Adjustment Device", and "Electromotive Servo Drive", respectively.

Figure 1:
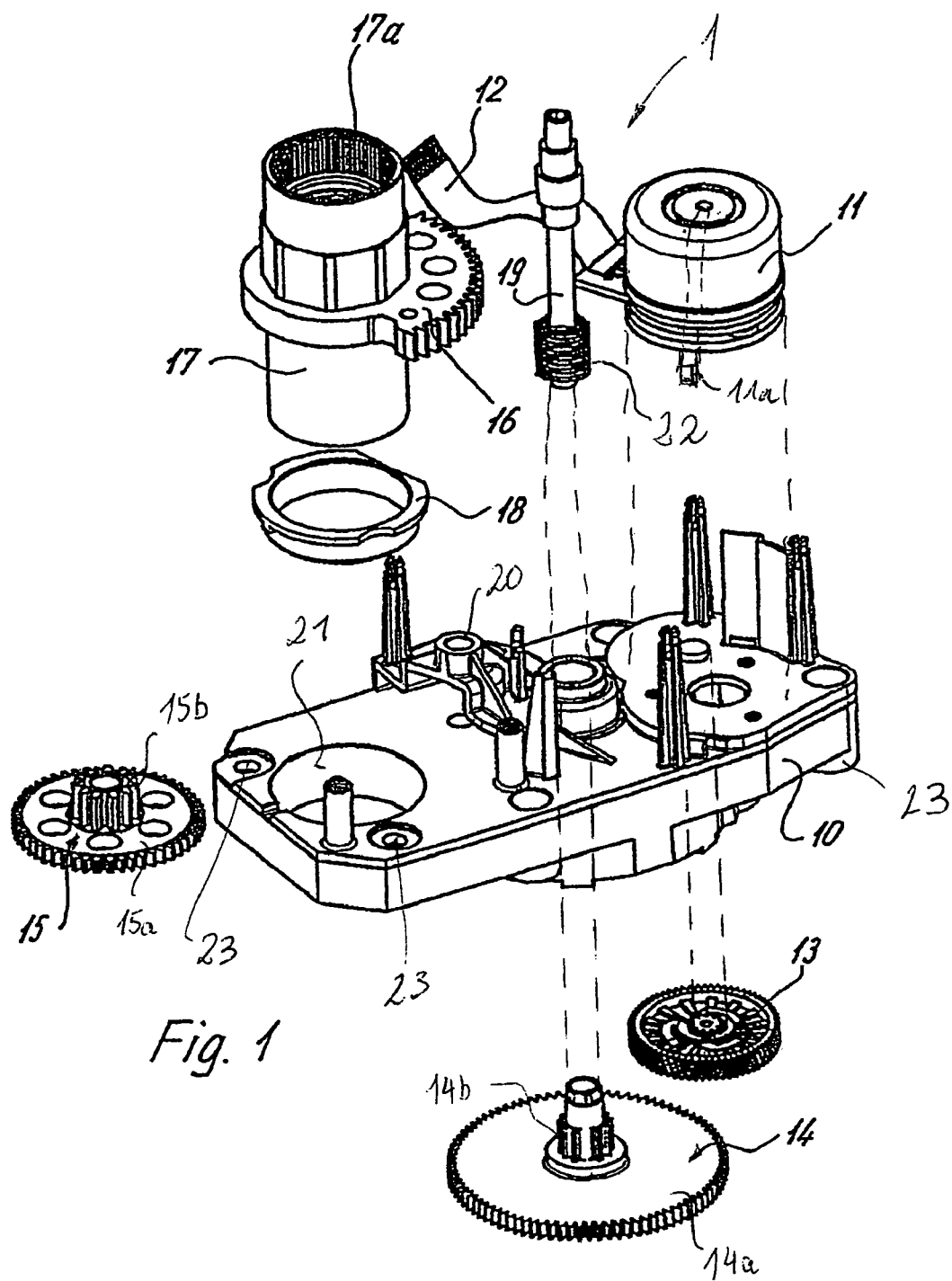
FIG. 1 shows an exploded view of an adjustment drive according to the present invention.
Figure 3:
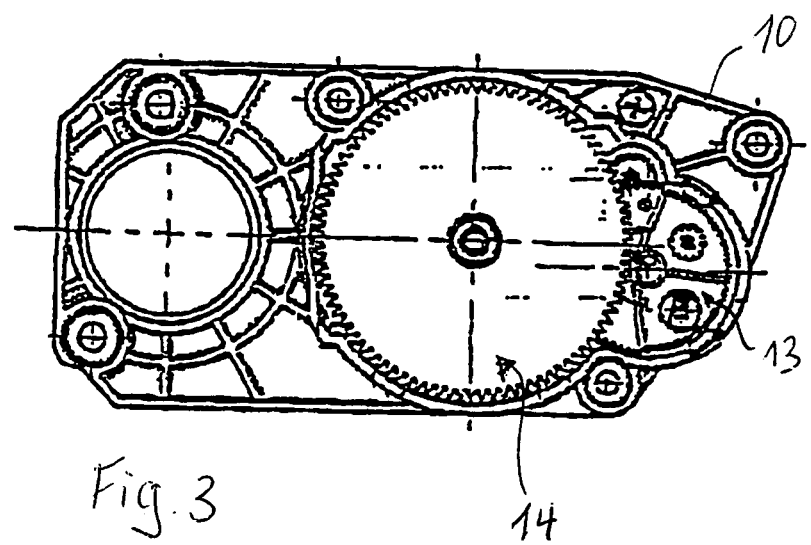
FIG. 3 shows a bottom view of the adjustment drive.

Turning now to FIG. 1, there is shown an exploded view of an adjustment drive according to the present invention, generally designated by reference numeral 1. The adjustment drive 1 includes a carrier 10 which has a plate-shaped configuration. Flange-mounted to the carrier 10 is a drive motor 11 as drive for a drive train comprised of gear wheels. The drive motor 11 is a brushless motor with an external rotor. Of course, other types of motors which generally follow the concepts outlined here are applicable as well. A flat cable 12 having several wires is used for power supply to the drive motor 11. The drive motor 11 has a splined output journal 11 for engagement with a gear wheel 13 which is disposed on the underside of the carrier 10, as shown in FIG. 3. Although not shown in the drawing for sake of simplicity, the drive train may also have an output journal for connection to a pinion that is in engagement with the gearwheel 13.

Figure 2:
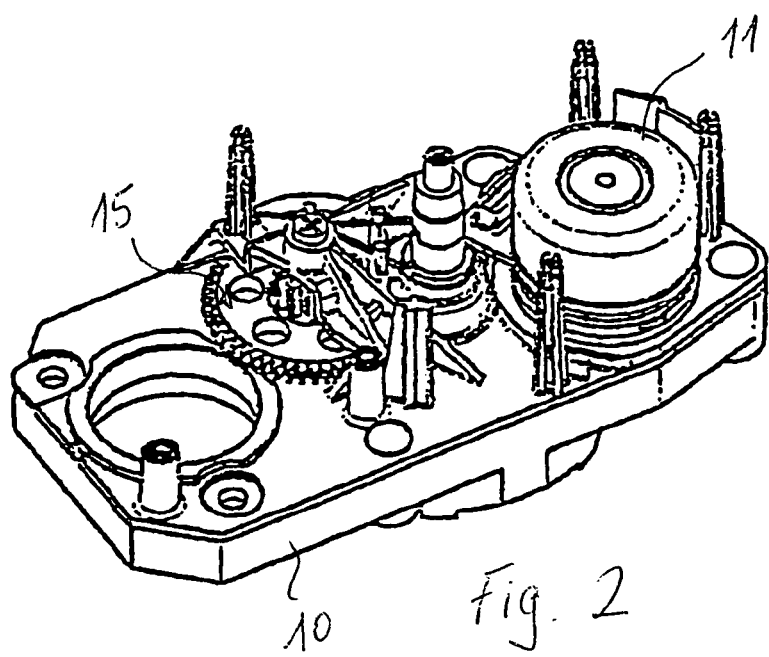
FIG. 2 shows a top view of the adjustment drive.

The gear wheel 13 is operatively connected to a double spur gear wheel assembly 14 with two gear wheels 14a, 14b having tooth systems of significantly different number of teeth and also positioned on the underside of the carrier 10. The gear wheel 13 is hereby in mesh with the gear wheel 14a, while the gear wheel 14b extends through the carrier 10 and is in mesh with a double spur gear wheel assembly 15 placed on the top side of the carrier 10, as shown in FIG. 2. The gear wheel assembly 15 has two gear wheels 15a, 15b with tooth systems of significantly different number of teeth. Hereby, the gear wheel 14b of the double spur gear wheel assembly 14 is in mesh with the gear wheel 15a having a greater number of tooth for reducing the motor speed of the drive motor 11 and provided with a pin (not shown) for insertion in an anchoring bore 20 on the carrier 10. The gear wheel 15b with a smaller number of teeth is in mesh with a tooth segment 16 which is mounted on a hollow shaft 17 in fixed rotative engagement, e.g. via complementary profiles. The tooth segment 16 is rotatably supported on the carrier 10.

The hollow shaft 17 includes internal teeth 17a for providing a driving connection through form-fitting engagement with a control element (not shown). A bearing ring 18 is provided for placement in a respective bore or recess 21 of the carrier 10.

The adjustment drive further includes an operating shaft 19 which is actuated by hand and is connected to a spring element 22 so as to allow a tensioning thereof by hand. Thus, the control element may be moved by the drive motor 11 in one direction, while the return movement of the control element is realized by the restoring force of the spring element 22. Adjustment drives of this type are also labeled as spring-return mechanisms.

As can be seen from FIG. 1, the drive components connected to the carrier 10 form a fully operational unitary structure which may assume a driving function, without provision of a housing. The provision of a housing may, however, be suitable for protection and safety considerations. In this case, the housing is so configured that the carrier 10, at least partially, contacts the inner surfaces of the housing. Moreover, the provision of the housing may afford also advantages as far as a support of the carrier is concerned because the carrier can be supported in suitably designed bearings. The housing may be configured to have housing portions which are screwed together at their corners by suitable screw fasteners, whereby the partition plane of both housing portions extends approximately in an area of the carrier.

For ease of illustration, the required parts for securing the components of the adjustment drive are not shown in detail. Suitably, the carrier 10 is provided with centering pins 23 (FIG. 1).

The adjustment drive according to the present invention may also be used for adjusting control elements in case of fire. In order to ensure the operation of the adjustment drive even at elevated temperatures, the mentioned components are made of metal, for example, steel or non-ferrous heavy metal.

While the invention has been illustrated and described in connection with currently preferred embodiments shown and described in detail, it is not intended to be limited to the details shown since various modifications and structural changes may be made without departing in any way from the spirit of the present invention. For example, it is, of course, conceivable to place the drive motor laterally to the carrier, instead of mounting it onto the carrier, as shown in FIG. 2. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A self-contained module of an adjustment drive, comprising:
   a carrier;
   a drive motor mounted to a first side of the carrier and having a splined output; and
   a drive train in driving relationship with the drive motor, said drive train including
      a first gear wheel mounted to a second side of the carrier and meshing with the output of the drive motor,
      a first double spur gear assembly mounted to the second side of the carrier and having two spur gears with different number of teeth, wherein the first gear wheel is operatively connected to the spur gear of greater number of teeth in overlapping relationship,
      a second double spur gear assembly mounted to the first side of the carrier and having two spur gears with different number of teeth, wherein the spur gear of smaller number of teeth of the first double spur gear assembly is in mesh with the spur gear of greater number of teeth of the second double spur gear assembly for reducing a motor speed of the drive motor, and
      a hollow shaft operatively connected to the spur gear of smaller teeth of the second double spur gear assembly for attachment of a control element to be adjusted.

2. The adjustment drive of claim 1, wherein at least the carrier and the plurality of gear wheels are made of steel or non-ferrous heavy metal.

3. The adjustment drive of claim 1, wherein the drive motor is flange-mounted to the first side of the carrier.

4. The adjustment drive of claim 1, wherein the drive train has an output member for receiving the hollow shaft in fixed rotative engagement.

5. The adjustment drive of claim 4, wherein the output member is a tooth segment.

6. The adjustment drive of claim 4, wherein the hollow shaft has internal teeth for connection in a rotationally fixed manner to a control element to be adjusted.

7. The adjustment drive of claim 1, wherein at least the carrier and the plurality of gear wheels are made of metal.

8. The adjustment drive of claim 1, wherein the carrier has a plate-shaped configuration.

9. The adjustment drive of claim 1, wherein the carrier is formed with a projecting centering pin.

10. The adjustment drive of claim 1, wherein the drive motor is a brushless motor and has an external rotor.

* * * * *